(12) United States Patent
Suzuki et al.

(10) Patent No.: US 8,074,174 B2
(45) Date of Patent: Dec. 6, 2011

(54) GUI APPLICATION DEVELOPMENT SUPPORTING APPARATUS, METHOD, AND COMPUTER PROGRAM

(75) Inventors: Hironori Suzuki, Kanagawa (JP); Kenichi Moriwaki, Tokyo (JP); Naoya Okamoto, Kanagawa (JP)

(73) Assignee: SONY Corporation, Tokyo (JP)

( * ) Notice: Subject to any disclaimer, the term of this patent is extended or adjusted under 35 U.S.C. 154(b) by 448 days.

(21) Appl. No.: 10/494,392

(22) PCT Filed: Aug. 29, 2003

(86) PCT No.: PCT/JP03/11037
§ 371 (c)(1),
(2), (4) Date: Nov. 18, 2004

(87) PCT Pub. No.: WO2004/023295
PCT Pub. Date: Mar. 18, 2004

(65) Prior Publication Data
US 2005/0071769 A1 Mar. 31, 2005

(30) Foreign Application Priority Data
Sep. 6, 2002 (JP) ................................. 2002-261363

(51) Int. Cl.
*G06F 3/00* (2006.01)
(52) U.S. Cl. ........ 715/744; 715/745; 715/746; 715/747; 715/762; 715/763
(58) Field of Classification Search .......... 715/744–747, 715/762–765; 709/217; 717/107; 719/310, 719/316
See application file for complete search history.

(56) References Cited

U.S. PATENT DOCUMENTS

| | | | |
|---|---|---|---|
| 5,675,752 A | 10/1997 | Scott et al. | |
| 5,710,880 A | 1/1998 | Howlett et al. | |
| 5,815,148 A | 9/1998 | Tanaka | |
| 5,844,554 A | 12/1998 | Geller et al. | |
| 5,883,639 A | 3/1999 | Walton et al. | |
| 6,222,537 B1 | 4/2001 | Smith et al. | |
| 6,421,694 B1 * | 7/2002 | Nawaz et al. | 715/526 |
| 6,563,517 B1 | 5/2003 | Bhagwat et al. | |

(Continued)

FOREIGN PATENT DOCUMENTS

EP 0 706 124 4/1996

(Continued)

OTHER PUBLICATIONS

Myers, B., et al., "Garnet: GUI," *Nikkei Electronics*, 522: 187-203, 1991.

(Continued)

*Primary Examiner* — Ba Huynh
(74) *Attorney, Agent, or Firm* — Finnegan, Henderson, Farabow, Garrett & Dunner

(57) ABSTRACT

An application development supporting apparatus and method that make it possible to generate a GUI application, freely altering the settings for graphical representation corresponding to devices, are provided. A configuration in which the logical part and the graphics representation part of each component set in a graphical user interface (GUI) are configured separately, and a GUI component is generated based on the logical part and the graphics representation part is adopted. Through the present configuration, it becomes possible to easily construct a GUI adapted to a device by sharing the logical part among various devices, and selecting different graphics representation parts, in which various representation modes are set, depending on the device.

6 Claims, 7 Drawing Sheets

U.S. PATENT DOCUMENTS

| | | | |
|---|---|---|---|
| 7,043,415 B1 * | 5/2006 | Dunlavey et al. | 703/12 |
| 7,093,264 B2 * | 8/2006 | Choi et al. | 719/316 |
| 7,234,111 B2 | 6/2007 | Chu et al. | |
| 2002/0070968 A1 | 6/2002 | Austin et al. | |
| 2002/0109721 A1 | 8/2002 | Konaka et al. | |
| 2002/0163535 A1 | 11/2002 | Mitchell et al. | |
| 2003/0070061 A1 * | 4/2003 | Wong et al. | 712/220 |
| 2005/0071769 A1 | 3/2005 | Suzuki et al. | |

FOREIGN PATENT DOCUMENTS

| | | |
|---|---|---|
| JP | 10-149280 | 6/1998 |
| JP | 11-73259 | 3/1999 |
| JP | 2000-276339 | 10/2000 |
| JP | 2002-244848 | 8/2002 |

OTHER PUBLICATIONS

Tonouchi and Nakajirna, "A GUI Library Based on Object Composition", NEC Research, vol. 12, No. 3, 1995, pp. 49-58.

"Eclipse Platform Technical Overview," Object Technology International, Inc., Jul. 2001, pp. 1-21.

Ply, Andrea W., "Software Development in ADA and MOTIF Using a GUI Builder," Science Applications International Corp., pp. 506-510.

"Building Applications with JBuilder," Borland JBuilder 8 Books Online, Oct. 25, 2002.

Spinellis, D., "Unix Tools as Visual Programming Components in a GUI-Builder Environment," Software Practice and Experience 2002; 32:57-71.

European Search Report dated Mar. 13, 2008.

International Search Report mailed Nov. 25, 2003 for International Application No. PCT/JP03/11036.

Office Action in co-pending U.S. Appl. No. 10/494,391 mailed Feb. 2, 2010 (3 pages).

Office Action in co-pending U.S. Appl. No. 10/494,391 mailed Nov. 24, 2009 (13 pages).

Office Action in co-pending U.S. Appl. No. 10/494,391 mailed Jun. 10, 2009 (13 pages).

Office Action in co-pending U.S. Appl. No. 10/494,391 mailed Apr. 15, 2009 (3 pages).

Office Action in co-pending U.S. Appl. No. 10/494,391 mailed Jan. 28, 2009 (11 pages).

Office Action in co-pending U.S. Appl. No. 10/494,391 mailed Jun. 25, 2008 (10 pages).

Office Action in co-pending U.S. Appl. No. 10/494,391 mailed Mar. 13, 2008 (3 pages).

Office Action in co-pending U.S. Appl. No. 10/494,391 mailed May 29, 2007 (9 pages).

* cited by examiner

```
+--[application]
   +--Application
   +--[customtoolkit]
      +--CButton.java
      +--CComponentFactory.java
      +--[laf]
         +--[custom]
            +--Button.java
            +--[images]
               +--buttcon_normal.off.gif
               +--buttcon_normal.on.gif
               +--buttcon_pushed.gif
```

FIG. 5

GUI APPLICATION DEVELOPMENT SUPPORTING APPARATUS, METHOD, AND COMPUTER PROGRAM

TECHNICAL FIELD

The present invention relates to a GUI application development supporting apparatus, method and computer program. More specifically, the present invention relates to a GUI application development supporting apparatus, method and computer program which make it possible to easily construct a user interface that is adapted to various devices by separately configuring the logical part and the graphics representation part of each component set in a graphical user interface (GUI), and making it possible to share the logical part among a variety of devices, while on the other hand making it possible to select the graphics representation part for each of the devices.

BACKGROUND ART

Displays such as CRT and LCD are used as data display user interfaces or data input/output user interfaces for PCs, communications terminals and various information appliances. For such displays, a screen image, for which functions that suit the usage of an information appliance are set, is displayed, for example, as a graphical user interface (GUI). Various functions, such as the arrangement of input buttons, settings for data input fields, processes to be carried out when the buttons are pressed, for example, are set for the GUI. As a programming language for developing application programs for setting the design and functions of such user interface screens, Java, which is distributed by Sun Microsystems, Inc., is used widely.

A program written in Java is converted into byte code as a computer/platform-independent Java executable file format, read by a Java virtual machine (Java VM) and converted (interpreted) into machine language and run on various apparatuses.

In Java, in order to create application software easily in a short period of time, software components that do not require re-compiling are prepared in advance, and programs are created by combining those components. In Java, a technology for making these components reusable (Java Beans) is constructed.

Components are set in units of various components such as, for example, windows to be displayed on a display, buttons, lists, combo boxes, text input fields and the like. For these components, there are defined "property" as attribute information such as, for example, shapes of buttons, position information and the like, "method" as a process as the result of an action for a component, and further "event" as a function for, when an action with respect to a component, such as the arrival of data, the occurrence of an interruption, the alteration of properties, the calling of a method or the like, occurs, communicating the event to another component. These "properties," "methods" and "events" are taken to be elements of components in Java Beans.

The smallest executable program unit in Java is referred to as "class" and a Java Program is constituted by one or more classes. A class has a variable as data and a method as an action. It is possible to forward and store this program component that is set as a class to a PC or an information appliance through a network such as the Internet or a LAN, and on the side of the apparatus in which the class file is stored, a platform-independent Java virtual machine is able to run the program saved in the class file.

As described above, the various components that constitutes a GUI, such as buttons, lists, combo boxes, text input fields and the like, are set as components that have attribute information such as their shapes, position information and the like, and further, for which functional information such as methods, events and the like are defined.

In other words, the logical part that defines functions like, for example, the process to be carried out when turned on, the process to be carried out when turned off or the like, of a component (GUI component), such as a button or the like, that is set on a graphical user interface, and the display image of the component, that is, the graphics representation part, are integrated. In the programming process for designing a GUI, various applications are designed by selecting and setting components in which the logical part and the graphics representation part are integrated.

However, the most appropriate graphical image differs depending on the device that is to be equipped with the GUI. For example, the image may on the whole be made softer and more subdued, or the image may be such that functionality is prioritized and excessive graphics removed, and so forth. In creating GUIs that have differing images as mentioned above, with the above-mentioned configuration in which components that have their logical part and graphics representation part integrated, it becomes necessary to generate distinct components that suit each image, the burden of creating components increases, and it leads to an increase in the number of components.

DISCLOSURE OF THE INVENTION

The present invention is made in view of the problems above, and makes it its object to provide a GUI application development supporting apparatus, method and computer program that make it possible to easily build a user interface adapted to various devices by making it possible to separately configure the logical part and the graphics representation part of each component set in a graphical user interface and by making the logical part sharable among various devices, while on the other hand making it possible to select the graphics representation part depending on the device.

The first aspect of the present invention is a GUI application development supporting apparatus for supporting the development of a GUI application that has settings information for functions and display modes of components constituting a graphical user interface (GUI), the GUI application development supporting apparatus characterized in that it includes:

a logical component storage section for storing logical components in which programs related to functions of the components are stored;

a graphics representation component storage section for storing graphics representation components in which programs related to graphics representation of the components are stored; and an edit processing section for generating a GUI component by combining a logical component extracted from the above-mentioned logical component storage section and a graphics representation component extracted from the above-mentioned graphics representation component storage section.

Further, one embodiment of a GUI application development supporting apparatus of the present invention is characterized in that the above-mentioned graphics representation component storage section may include a plurality of graphics representation component storage sections in which a plurality of distinct graphics representation processing execution programs is stored, and in that the above-mentioned edit processing section may have a configuration in which, in accordance with input information, a process of selecting one graphics representation component storage section from the above-mentioned plurality of graphics representation component storage sections, and extracting a graphics representation component from the selected storage section is executed.

Further, one embodiment of a GUI application development supporting apparatus of the present invention is characterized in that the above-mentioned graphics representation component storage section may include a plurality of graphics representation component storage sections in which a plurality of distinct graphics representation processing execution programs is stored, and in that an animation execution program is stored in a graphics representation component stored in at least one or more graphics representation component storage sections.

Further, one embodiment of a GUI application development supporting apparatus of the present invention is characterized in that the above-mentioned edit processing section is of a configuration in which an editing process for properties, methods and events corresponding to each component is executed in the generation of GUI components.

Further, the second aspect of the present invention is a GUI application program generating method that generates a GUI application having settings information for functions and display modes of components constituting a graphical user interface (GUI), the GUI application program generating method characterized in that it includes:

a logical component selection step of selectively extracting a logical component from a logical component storage section that stores logical components in which programs related to functions of the components are stored;

a graphics representation component selection step of selectively extracting a graphics representation component from a graphics representation component storage section that stores graphics representation components in which programs related to graphics representation of the components are stored; and an edit processing step of generating a GUI component by combining the logical component extracted from the above-mentioned logical component storage section and the graphics representation component extracted from the above-mentioned graphics representation component storage section.

Further, one embodiment of a GUI application program generating method of the present invention is characterized in that the above mentioned graphics representation component storage section may include a plurality of graphics representation component storage sections in which a plurality of distinct graphics representation processing execution programs is stored, and in that the above-mentioned graphics representation component selection step may execute a process in which, in accordance with input information, one graphics representation component storage section is selected from the above-mentioned plurality of graphics representation component storage sections, and a graphics representation component is extracted from the selected storage section.

Further, one embodiment of a GUI application program generating method of the present invention is characterized in that the above-mentioned edit processing step may execute an editing process of properties, methods and events corresponding to each component in generating a GUI component.

Further, the third aspect of the present invention is a computer program that executes a GUI application program generating process for generating a GUI application that has settings information for functions and display modes of components constituting a graphical user interface (GUI), the computer program characterized in that it includes:

a logical component selection step of selectively extracting a logical component from a logical component storage section that stores logical components in which programs related to functions of the components are stored;

a graphics representation component selection step of selectively extracting a graphics representation component from a graphics representation component storage section that stores graphics representation components in which programs related to graphics representation of the components are stored; and a step of generating a GUI component by combining the logical component extracted from the above-mentioned logical component storage section and the graphics representation component extracted from the above-mentioned graphics representation component storage section.

According to the configuration of the present invention, since a configuration is adopted where the logical part and the graphics representation part of each component set in a graphical user interface (GUI) are configured separately, and in which a GUI component is generated based on the logical part and the graphics representation part, it is made possible to easily build a user interface adapted to various devices by making it possible to share the logical part among various devices, while on the other hand making it possible to select from, in accordance with each device, different graphics representation parts in which various representation modes are set.

In addition, a computer program of the present invention is a computer program that may be provided to, for example, a general-purpose computer system, which is capable of running various program codes, through a storage medium or a communications medium that provide them in a computer readable format, examples of which include storage media such as CDs, FDs, MOs and the like or communications media such as a network. By providing such a program in a computer readable format, processes that follow the program are achieved on a computer system.

Other objectives, features and advantages of the present invention should become apparent through a detailed description based on embodiments of the present invention, which will be described below, and the appended drawings. A system as used in the present description refers to a logical aggregate configuration of a plurality of apparatuses, and is not limited to one in which each constituent apparatus resides in the same body.

BRIEF DESCRIPTION OF THE DRAWINGS

FIG. 5 is a diagram illustrating an example of a file configuration necessary for executing the processing by a GUI application development supporting apparatus of the present invention;

BEST MODES FOR CARRYING OUT THE INVENTION

Figure 1:
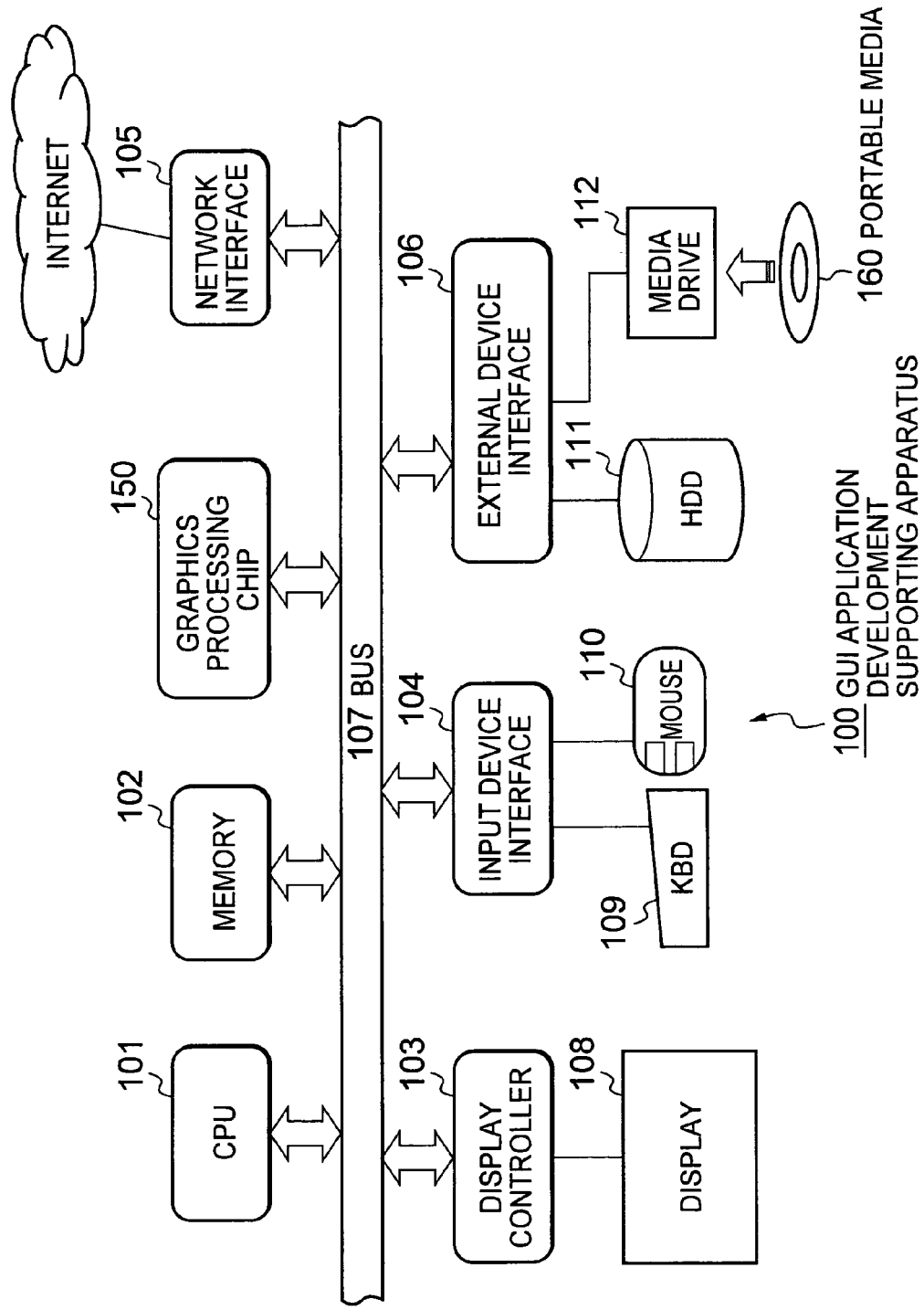
FIG. 1 is a diagram showing a hardware configuration example of a GUI application development supporting apparatus of the present invention.

Below, a GUI application development supporting apparatus, method and computer program of the present invention will be described in detail with reference to the drawings.

1. Hardware Configuration

First, a hardware configuration example of a GUI application development supporting apparatus of the present invention will be described with reference to FIG. 1. Each element within a GUI application development supporting apparatus 100 will be described with reference to FIG. 1. A CPU (Central Processing Unit) 101, which is the main controller of the GUI application development supporting apparatus 100, executes various kinds of GUI application development programs under the control of an operating system (OS). The CPU 101 performs, for example, the execution of a program creating process based on the Java language, specifically processes of setting functions, setting the display image and the like of each component, such as buttons, combo boxes and the like, that is set on a GUI screen. As shown in drawing, the CPU 101 is interconnected with other constituent parts through a bus 107.

A memory 102 is a storage device that is used to store program codes to be run by the CPU 101 or to temporarily store working data under execution. The memory 102 shown in the same diagram includes both a non-volatile memory such as ROM as well as a volatile memory such as DRAM.

A graphics processing chip 150 is a chip into which is incorporated a dedicated processing circuit that executes color processing for various GUI components.

A display controller 103 as a display control section is a dedicated controller for actually processing draw commands issued by the CPU 101. The draw data processed by the display controller 103 is screen outputted by a display 108 after, for example, being once written in a frame buffer (not shown). For example, an image reproduced from a HDD (111) or an image processed by the CPU 101 may be displayed on the display 108, and a user may view the presented screen.

An input device interface 104 is an apparatus for connecting user input devices, such as a keyboard 109, a mouse 110 and the like, to the GUI application development supporting apparatus 100. The user is able to input commands for processing or displaying images and the like through the keyboard 109 and the mouse 110.

In compliance with a predetermined communications protocol such as Ethernet, a network interface 105 is capable of connecting the GUI application development supporting apparatus 100 to a local network such as a LAN (Local Area Network), and further to a wide area network such as the Internet.

A plurality of host terminals and servers (not shown) are connected on a network in a transparent state and a distributed computing environment is constructed. Distribution services of software programs and data contents can be provided on the network. For example, image data from another server in which moving images, still images and the like are stored can be downloaded to the HDD (111) via the network.

An external device interface 106 is an apparatus for connecting external apparatuses, such as a digital camera, the hard disk drive (HDD) 111, a media drive 112 and the like, to the GUI application development supporting apparatus 100.

The HDD 111 is an external storage apparatus in which a magnetic disk as a storage medium is fixedly mounted, and is advantageous in terms of storage capacity, data transfer rate and the like, and allows for random access. For example, program installation where a software program is stored on the HDD 111 in an executable condition is possible. On the HDD 111, program codes of the operating system, application programs and device drivers to be run by the CPU 101 are stored in a non-volatile manner.

The media drive 112 is an apparatus into which portable media 160, such as a CD (Compact Disc), an MO (Magneto-Optical disc), a DVD (Digital Versatile Disc) and the like, can be loaded, and which is for accessing the data recording surface thereof.

The portable media 160 are used primarily for purposes such as backing up software programs, data files and the like as data in a computer readable format, and transferring them between systems (that is, including sales, circulation and distribution). It is possible to physically circulate and distribute an application program for performing various processes between a plurality of devices using these portable media.

In addition, an apparatus such as the one shown in FIG. 1 can be realized as a compatible machine or a succeeding machine of IBM Corporation's personal computer "PC/AT (Personal Computer/Advanced Technology." Naturally, it is also possible to apply a computer equipped with a different architecture.

2. Functional Configuration

Next, the functional configuration of a GUI application development supporting apparatus of the present invention that develops a GUI application by separately configuring the logical part and the graphics representation part of each component that is set in a graphical user interface (GUI) will be described with reference to FIG. 2.

Figure 2:
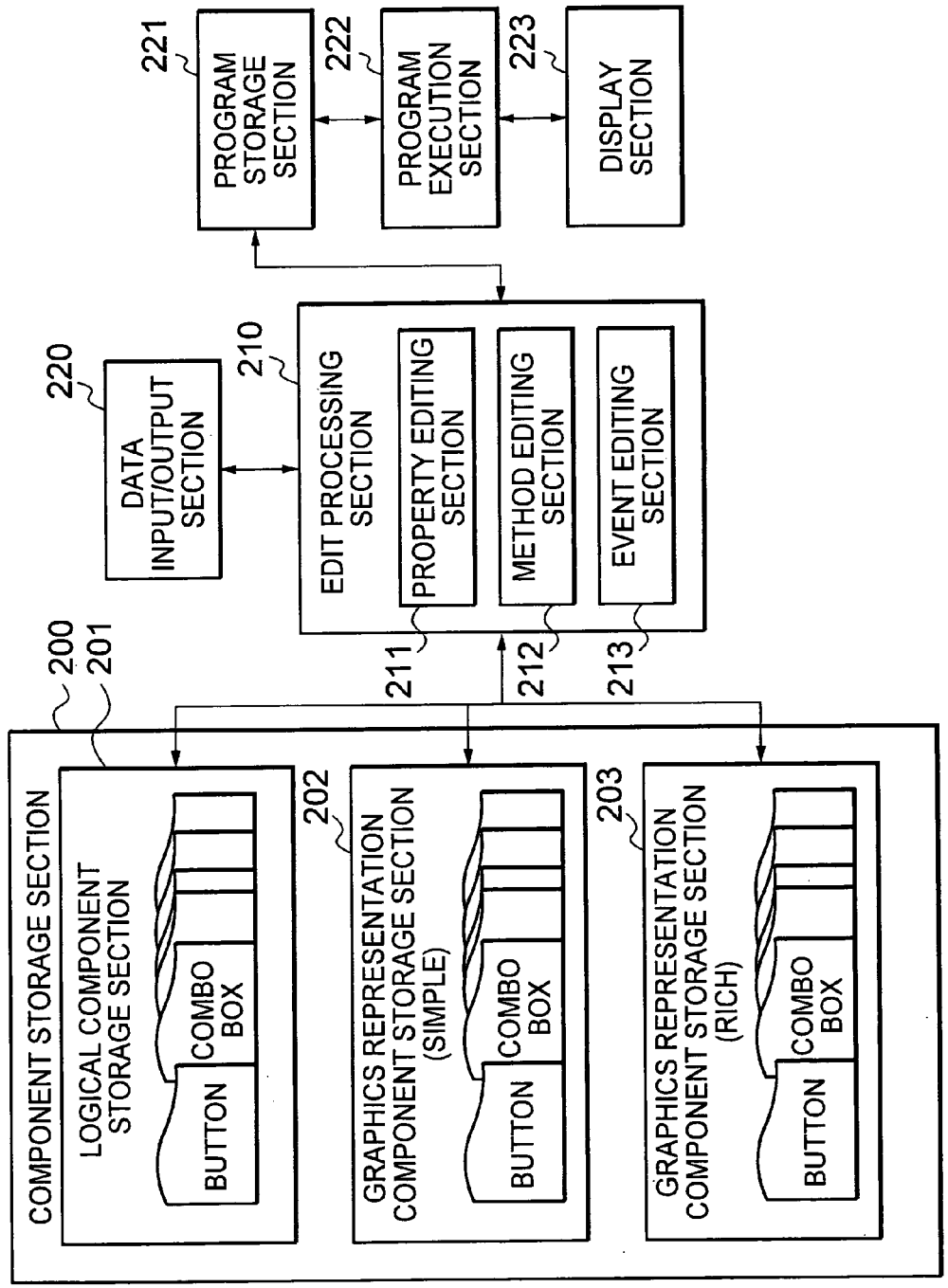
FIG. 2 is a block diagram showing the functional configuration of a GUI application development supporting apparatus of the present invention.

As shown in FIG. 2, a GUI application development supporting apparatus of the present invention has a component storage section 200 in which various parts (components) to be set on a screen that is to serve as a user interface, such as buttons, combo boxes, lists, windows, text boxes and the like, are stored. The component storage section 200 includes a logical component storage section 201, a graphics representation component storage section (Simple) 202 and a graphics representation component storage section (Rich) 203.

The logical component storage section 201 is a component that stores logical information regarding various parts (components) to be set on a screen that is to serve as a user interface, such as buttons, combo boxes, lists, windows, text boxes and the like. For example, if it were a button, it is configured as a software program component that defines functions, such as the process for when it is turned on, the process for when it is turned off and the like, as functions of the button.

On the other hand, the graphics representation component storage section (Simple) 202 and the graphics representation component storage section (Rich) 203 are configured as software program components that store display image information of components, that is, as software program components that store a graphics representation program. The graphics representation component storage section (Simple) 202 and the graphics representation component storage section (Rich) 203 are components that each store a program that executes a different graphics representation.

An operator as a developer of GUI application programs executes various data input with respect to an edit processing section 210 via a data input/output section 220, and constructs a GUI component by setting the function and graphical image of each component, such as a button, combo box or the like.

A creation process execution program for components is, for example, one class (factory class) of a JAVA program. The edit processing section 210 creates various components by executing the factory class. In addition, processing by the edit processing section 210 is, in the case of the hardware configuration shown in FIG. 1, is processing executed under the control of the CPU 101.

Components are edited at the edit processing section 210 as GUI components for which "property" as attribute information such as, for example, shapes of buttons, position information and the like, "method" as a process as the result of an action for a component, and further "event" as a function for, when an action with respect to a component, such as the arrival of data, the occurrence of an interruption, the alteration of properties, the calling of a method or the like, occurs, communicating the event to another component are defined.

The edit processing section 210 includes a property editing section 211 that edits properties set for components, a method editing section 212 that edits methods, and an event editing section 213 that edits events.

In setting the look, that is, the graphics representation, of a GUI component to be generated, the operator inputs look & feel package specification data with respect to the edit processing section 210 that executes the factory class. In other words, the operator specifies either "Rich" or "Simple."

In accordance with this specification data, the factory class is executed at the edit processing section 210, and depending on the specification data, the corresponding program component is read from either the graphics representation component storage section (Simple) 202 or the graphics representation component storage section (Rich) 203, while at the same time the component is generated along with a component read from the logical component storage section 201.

For example, in generating a GUI component with respect to a button, a button component is read from the logical component storage section 201 that stores components in which logical information regarding components is stored, and further, depending on the look & feel package specification data from the operator, namely the specification data of either "Rich" or "Simple," a component storing a graphics representation program of the button is read from the graphics representation component storage section (Simple) 202 or the graphics representation component storage section (Rich) 203, and a single button component is generated by combining the logical component and either the "Rich" or "Simple" graphics representation component.

A similar editing process is executed for various components other than buttons, such as combo boxes, lists, windows, text boxes and the like, and after the editing process, the set GUI application program is stored in a program storage section 221, executed at a program execution section 222, and the generated GUI is displayed on a display section 223.

In addition, in the embodiment described above, an example was described where only the two types of "Simple" and "Rich" were set for components that store a graphics representation program, but the number of types may also be set to an arbitrary number of 3 and above, and the operator may input some specification data of the graphics representation components that are set, whereby a graphics representation component is selected in accordance with the specification data, and various GUI components created.

3. Processing Sequence

Next, the procedures in a process for generating a GUI component by applying a GUI application development supporting apparatus of the present invention will be described with reference to FIG. 3 and FIG. 4.

Figure 3:
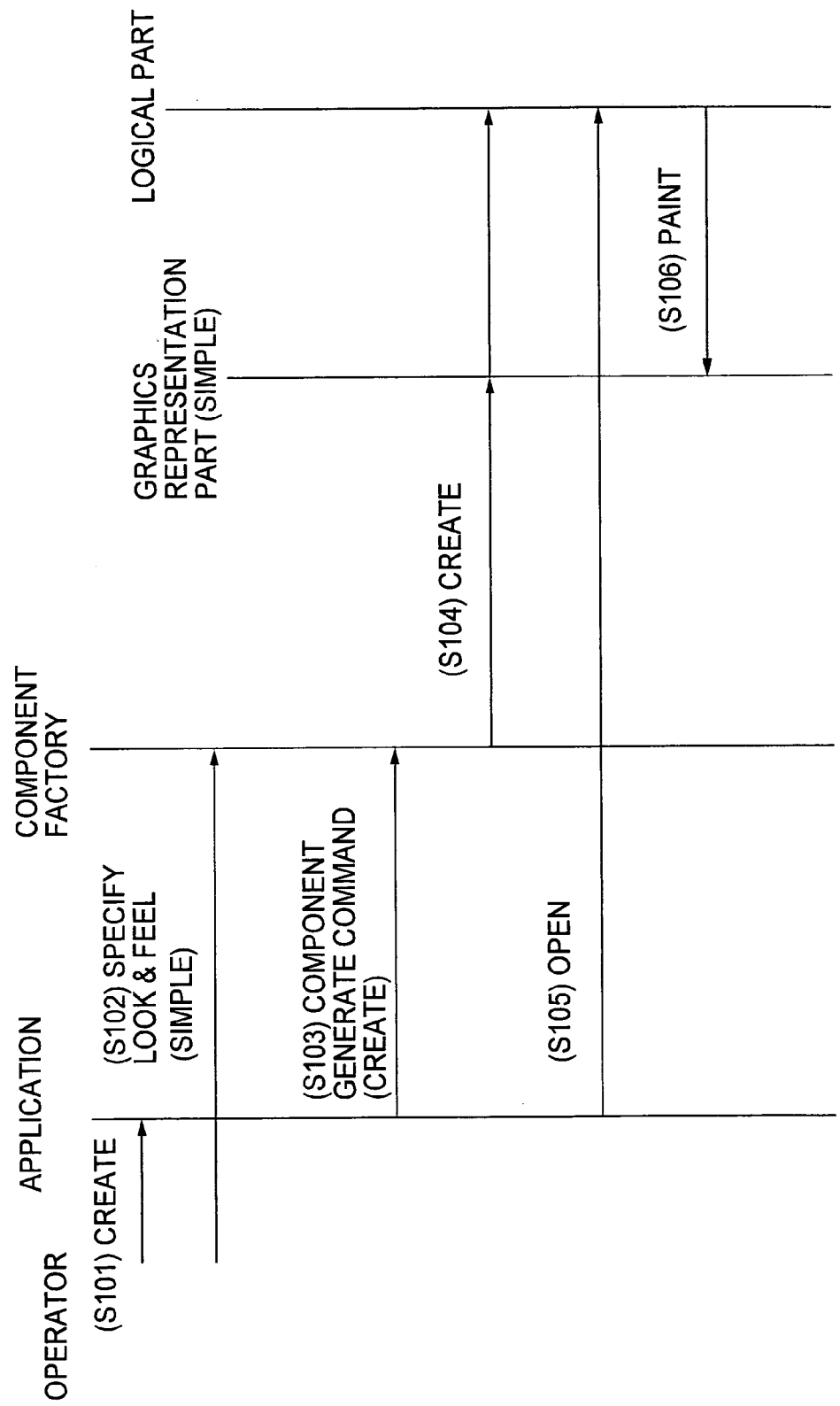
FIG. 3 is a sequence diagram illustrating the processing sequence of a GUI application development supporting apparatus of the present invention.

FIG. 3 is a diagram that shows a processing sequence in which the "Simple" graphics representation component is selected and a GUI component generated. In FIG. 3, there is shown, from the left, each of the processes of the operator, GUI generating application, component factory, graphics representation part and logical part. The processes of the graphics representation part and the logical part correspond to the execution of the programs stored in the components read from the graphics representation component storage section (Simple) 202 and the logical component storage section 201 shown in FIG. 2, and these processes as well as the process of the component factory are executed at the edit processing section 210 in FIG. 2.

First, in step S101, the operator inputs a create command (Create) for a GUI component to the GUI generating application. This create command (Create) for the GUI component is inputted along with data that specifies the kind of the component, such as, for example, "button," "list," "combo box," "radio button," "window" and the like.

Further, in step S102, a "look & feel" specification for specifying the graphics representation is outputted from the operator to the component factory via the application. Here, it is assumed that "Simple" is specified as the "look & feel" specification.

Next, in step S103, a component create command is outputted to the component factory from the application. Identification data that indicates the component kind specified in the previous step S101 is included in this command.

In step S104, the component create command (Create) is outputted from the component factory with respect to the graphics representation part (Simple) and the logical part, and the creation of a component is executed in accordance with the stored programs of the logical part and the graphics representation part.

The processes subsequent to step S105 show a processing sequence in a case where a component is processed by the application, for example as in when an open process command for a "window" as a component is performed. An open process command for a component from the application is handed to the logical part, and based on the execution of the program of the logical part, a paint command is handed to the graphics representation part (Simple). The graphics representation part (Simple) executes paint processing for the component based on the inputted command from the logical part.

Here, since the graphics representation part adopted for component generation is "Simple," the generated component to be displayed on the display, namely buttons and the like, take on a Simple configuration in which color settings by paint are done.

Next, a processing sequence in which the "Rich" graphics representation component is selected and a GUI component generated will be described with reference to FIG. 4. As in FIG. 3, from the left, there are shown each of the processes by the operator, GUI generating application, component factory, graphics representation part and logical part. As in FIG. 3, the processes of the graphics representation part and the logical part correspond to the execution of the programs stored in the components read from the graphics representation component storage section (Rich) 202 and the logical component storage section 201 shown in FIG. 2, and these processes as well as the process of the component factory are executed at the edit processing section 210 in FIG. 2.

First, in step S201, the operator inputs a create command (Create) for a GUI component to the GUI generating application. This create command (Create) for the GUI component is inputted along with data that specifies the kind of the component, such as, for example, "button," "list," "combo box," "radio button," "window" and the like.

Further, in step S202, a "look & feel" specification for specifying the graphics representation is outputted from the operator to the component factory via the application. Here, it is assumed that "Rich" is specified as the "look & feel" specification.

Next, in step S203, a component create command is outputted to the component factory from the application. Identification data that indicates the component kind specified in the previous step S201 is included in this command.

In step S204, the component create command (Create) is outputted from the component factory with respect to the graphics representation part (Rich) and the logical part, and the creation of a component is executed in accordance with the stored programs of the logical part and the graphics representation part (Rich).

The processes subsequent to step S205 show a processing sequence in a case where a component is processed by the application, for example as in when an open process command for a "window" as a component is performed. An open process command for a component from the application is handed to the graphics representation part, and animation is executed (S206) based on the execution of an animation program stored in the graphics representation part.

Further, in step S207, the open process command is handed to the logical part, and based on the execution of the program of the logical part, a paint command is handed to the graphics representation part (Rich), and the graphics representation part (Rich) executes paint processing for the component in accordance with the inputted command from the logical part.

Figure 4:
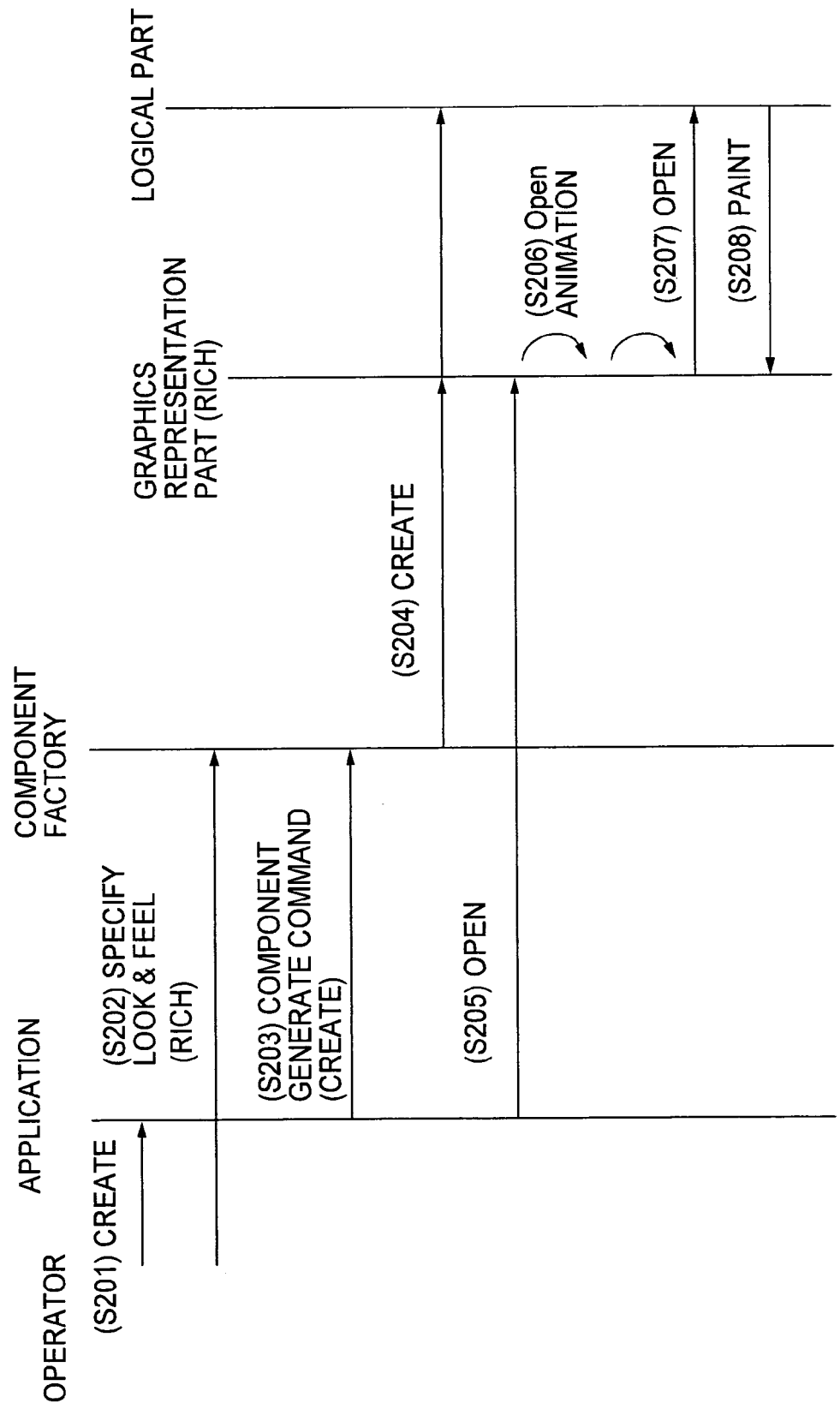
FIG. 4 is a sequence diagram illustrating the processing sequence of a GUI application development supporting apparatus of the present invention.

In the sequence diagram shown in FIG. 4, since the graphics representation part adopted for component generation is "Rich," the generated component to be displayed on the display, namely buttons and the like, take on a configuration in which not only color settings by paint are done, but also animation representation is executed.

4. File Configuration Example

A file configuration example for executing such component display as mentioned above will be described.

For example, as files in a case where a "buttcon" component, as an icon having the functionality of a button as an example of a GUI component, is configured as a GUI component, each of the following files, for example, becomes necessary.

Cbuttcon.java: a class for implementing the logical part of the buttcon,
Buttcon.java: a class for implementing the look & feel part as the graphics representation part of the buttcon,
buttcon_normal_off.gif: the image when the buttcon is "off,"
buttcon_normal_on.gif: the image when the buttocon is "on,"
buttcon_pushed.gif: the image when the buttcon is being pushed,
CComponentFactory.java: a factory class, which the application uses to create the buttcon;
Application.java: an application for displaying the created buttcon.

A class refers to an executable unit of program in Java.

The directory configuration of each of the files above is shown in FIG. 5. A [customtoolkit] file as a tool kit exists below some GUI application file [application], and in this file are included CButtcon.java: a class for implementing the logical part of the buttcon, CcomponentFactory.java: a factory class that the application uses to create the buttcon and further a look & feel file [laf] as graphics representation information.

Buttcon.java: a class for implementing the look & feel part as the graphics representation part of the buttcon, that is, a class corresponding to the graphics representation component described above, is included in the look & feel file [laf]. Further, as image data files [image], each of buttcon_normal_off.gif: the image for when the buttcon is "off," buttcon_normal on.gif: the image for when the buttcon is "on," and buttcon_pushed.gif: the image for when the buttcon is being pushed is included.

The GUI application program, in accordance with the user's input information, executes a process in which the processing programs and image data included in each of these files are applied. Specifically, both various function executing processes that follow the program of the logical part class as well as various graphics representation processes that follow the program of the graphics representation part class are executed.

5. Display Example

Next, with reference to FIG. 6 and FIG. 7, a display processing example for GUI components generated based on a configuration in which the logical part and the graphics representation part of each component are separated will be described.

Figure 6:
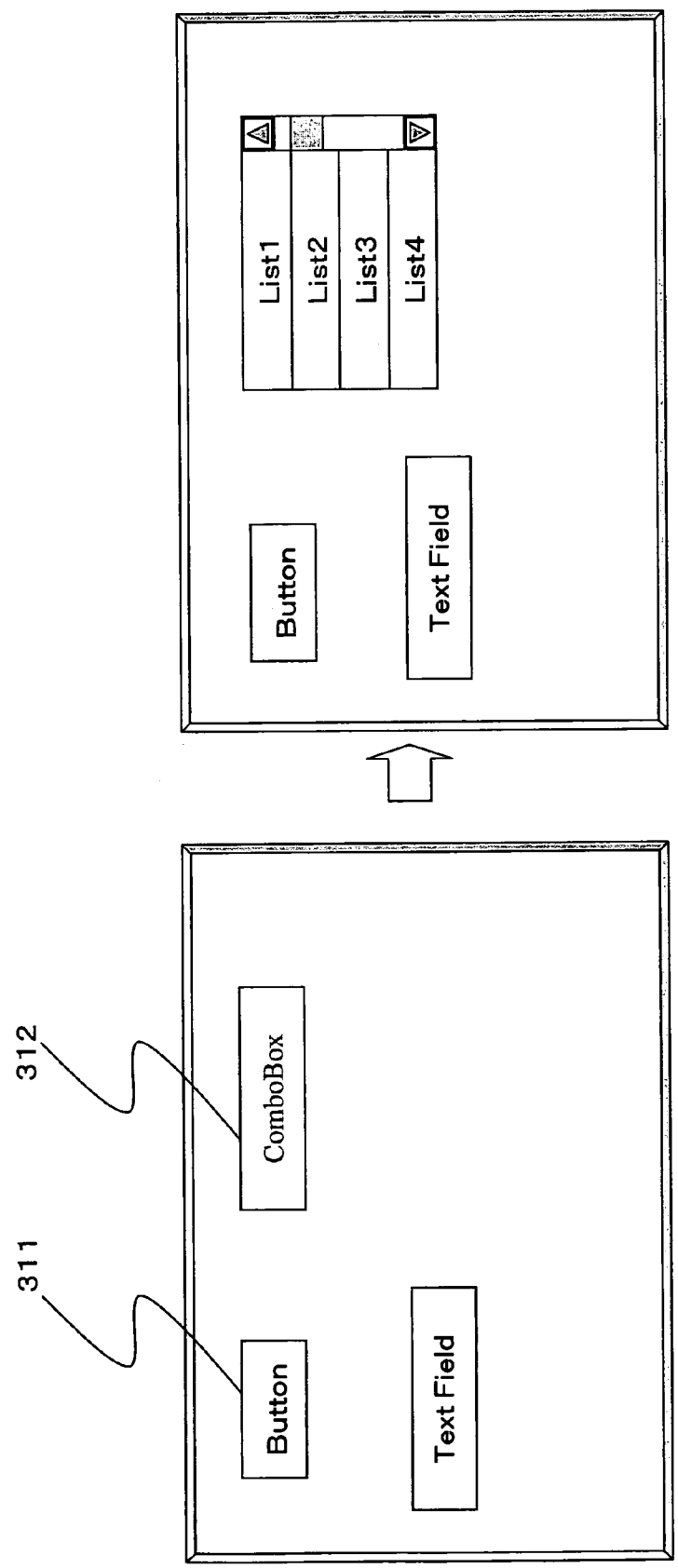
FIG. 6 is a diagram illustrating a display example of a GUI component generated with a GUI application development supporting apparatus of the present invention.

FIG. 6 shows an example in which each component is generated and displayed while applying the graphics representation part (Simple). A description will be given taking a button 311 and a combo box 312 as examples of GUI components.

When the button 311 is manipulated, for example when the button is turned on, turned off, or when focus settings, in other words cursor settings, are carried out, processes based on on and off operations of the button are executed by processes of the logical part of the button component. Further, through, for example, a paint command from the logical part, the graphics representation part (Simple) is executed, and paint processing, that is, a process of changing the displayed color of the button, is carried out.

When the combo box 312 is manipulated, for example when the combo box 312 is opened, closed, etc., processes based on opening and closing operations of the combo box are executed by processes of the logical part of the combo box component. Further, through, for example, a paint command from the logical part, the graphics representation part (Simple) of the combo box component is executed, and paint processing, that is, a process such as changing the displayed color of the combo box, is carried out.

In addition, what kind of graphics representation is to be executed through a process from the operator may be set differently for each GUI component. In other words, by altering the processing program of the graphics representation part (Simple), graphics representation processing that suits each component becomes possible.

Figure 7:
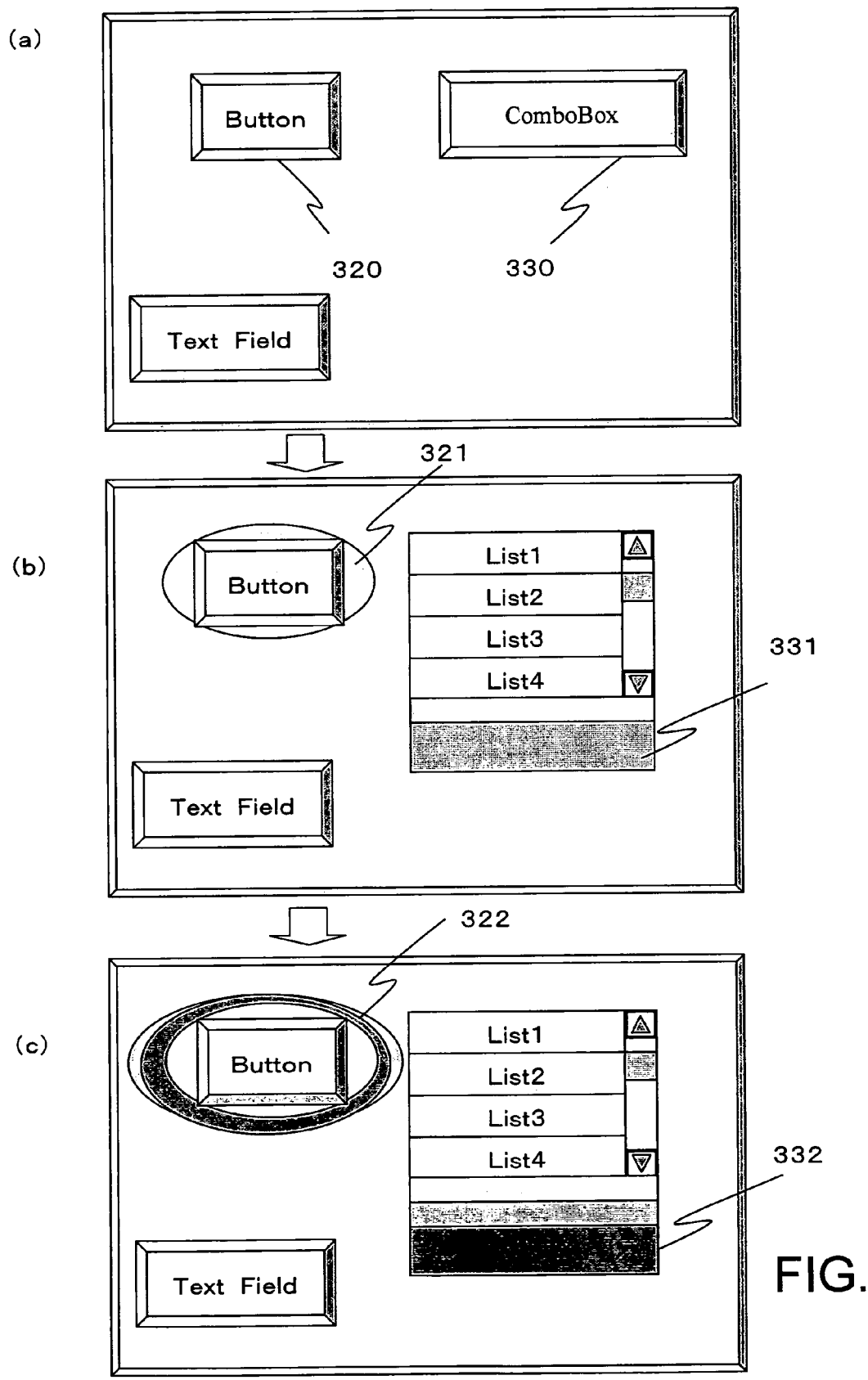
FIG. 7 is a diagram illustrating a display example of a GUI component generated with a GUI application development supporting apparatus of the present invention.

FIG. 7 shows an example in which each component is generated and displayed while applying the graphics representation part (Rich). A description will be given taking a button 320 and a combo box 330 as examples of GUI components.

When the button 320 is manipulated, for example when the button is turned on, turned off, or when focus settings, in other words cursor settings, are carried out, animation 321 and 322 are executed as processes of the graphics representation part (Rich) of the button component in addition to the paint processing described above. Though it is hard to see from the diagram, in (b) and (c), an animation where a ripple propagates around the button is executed. In addition, through processes of the logical part, processes based on on and off operations of the button are executed.

When the combo box 330 is manipulated, for example when the combo box 330 is opened, closed, etc., processes based on opening and closing operations of the combo box are executed by processes of the logical part of the combo box component, while at the same time animations 331 and 332 are executed as processes of the graphics representation part (Rich) of the combo box component. Though it is hard to see from the diagram, in (b) and (c), an animation that is set so that it extends downward from the lower portion of the combo box is executed.

As described above, in a configuration of the present invention, since the logical part and the graphics representation part of each component set in a graphical user interface (GUI) are configured separately, and since a configuration in which a GUI component is generated based on the logical part and the graphics representation part is adopted, it is made possible to easily construct a user interface adapted to various devices by making it possible to share the logical part among various devices, while on the other hand making it possible to select distinct graphics representation parts, in which various representation modes are set, in accordance with each device.

The present invention has been described above in detail with reference to specific embodiments. However, it should be obvious that it is possible for those skilled in the art to make modifications and substitutions to these embodiments without departing from the scope of the present invention. In other words, the present invention has been disclosed in the form of examples, which are not to be considered restrictive. In determining the scope of the present invention, the claims described should be taken into consideration.

In addition, the series of processes described in this specification can be executed through hardware, software, or a composite configuration of both. In executing the processes through software, a program in which the processing sequence is recorded may be installed to a memory within a computer that is incorporated into dedicated hardware and executed, or the program maybe installed to a general-purpose computer that is capable of executing various processes and executed.

For example, the program may be recorded in advance on a hard disk or ROM (Read Only Memory) as recording media. Alternatively, the program may be temporarily or permanently stored (recorded) on removable recording media, such as flexible disks, CD-ROMs (Compact Disc Read Only Memory), MO (Magneto Optical) disks, DVDs (Digital Versatile Disc), magnetic disks, semiconductor memories and the like. Such removable recording media may be provided as so-called packaged software.

In addition, besides being installed to a computer from such removable recording media described above, the program may be transferred wirelessly to a computer from a download site, or may be transferred by wire to a computer via such networks as a LAN (Local Area Network) and the Internet, and the computer may receive the program thus transferred, and install it to a recording medium such as a built-in hard disk or the like.

In addition, the various processes described in the specification may not only be executed chronologically as described, but also may be executed in a parallel manner or individually depending on the processing capability of the apparatus that executes the processes or as required. In addition, system as used in the present specification refers to a logical aggregate configuration of a plurality of apparatuses, and is not limited to one in which each constituent apparatus resides in the same body.

INDUSTRIAL APPLICABILITY

As described above, according to an application development supporting apparatus and method of the present invention, since a configuration is adopted where the logical part and the graphics representation part of each component set in a graphical user interface (GUI) are configured separately, and a GUI component is generated based on the logical part and the graphics representation part, it becomes possible to easily construct a user interface adapted to various devices by making it possible to share the logical part among various devices, while on the other hand making it possible to select distinct graphics representation parts, in which various representation modes are set, depending on the device.

The invention claimed is:

1. A graphical user interface (GUI) application development apparatus for developing a GUI application, the GUI application development apparatus comprising:
   a data input section for receiving user input information, the user input information selecting a GUI component for the GUI application and selecting a simple graphics representation for the selected GUI component or a rich graphics representation for the GUI component;
   a logical component storage section storing logic program components for GUI components, the logic program components defining functions performed by the GUI components when executed the GUI application;
   a simple graphics representation component storage section storing simple graphics representation program components for the GUI components, the simple graphics representation program components defining simple graphics display information of the GUI components when executed in the GUI application;
   a rich graphics representation component storage section storing rich graphics representation program components for the GUI components, the rich graphics representation program components defining rich graphics display information of the GUI components when executed in the GUI application; and
   an edit processing section that:
      selects a logic program component from the logic program component storage section corresponding to the selected GUI component;
      when the user input information indicates a selection of a simple graphics representation, selects a simple graphics representation program component corresponding to the selected GUI component from the simple graphics representation component storage section;
      when the user input information indicates a selection of a rich graphics representation, selects a rich graphics representation program component for the GUI component from the rich graphics representation component storage section; and generates the selected GUI component based on the selected logic program component and on the selected simple graphics representation program component or the selected rich graphics representation program component, wherein:

paint process execution programs for painting the GUI components are stored in the simple graphics representation program components, and animation execution program for animating the GUI components are stored in the rich graphics representation program components.

2. The GUI application development apparatus according to claim 1, wherein the edit processing section executes edit processing of properties, methods, and events corresponding to the selected GUI component.

3. A method for generating a GUI application, the method comprising:

receiving user input information selecting a GUI component for the GUI application and selecting a simple graphics representation for the selected GUI component or a rich graphics representation for the selected GUI component;

extracting from a logical component storage section a logic program component defining functions performed by the selected GUI component in the GUI application;

when the user input information indicates a selection of a simple graphics representation, extracting from a simple graphics representation component storage section a simple graphics representation program component defining simple graphics display information of the selected GUI component in the GUI application, the selected simple graphics representation program component including a paint process execution program for painting the selected GUI component in the GUI application;

when the user input information indicates a selection of a rich graphics representation, extracting from a rich graphics representation component storage section a rich graphics representation program component defining rich graphics display information of the selected GUI component in the GUI application, the selected rich graphics representation program component including an animation execution program for animating the GUI component in the GUI application; and generating the selected GUI component based on the extracted logic program component and on the extracted simple graphics representation program component or the extracted rich graphics representation program component.

4. The method according to claim 3, further comprising edit processing of properties, methods, and events corresponding to the selected GUI component.

5. A computer-readable medium having a computer program that executes a method for generating a GUI application, the method comprising:

receiving user input information selecting a GUI component for the GUI application and selecting a simple graphics representation for the selected GUI component or a rich graphics representation for the selected GUI component;

extracting from a logical component storage section a logic program component defining functions performed by the selected GUI component in the GUI application;

when the user input information indicates a selection of a simple graphics representation, extracting from a simple graphics representation component storage section a simple graphics representation program component defining simple graphics display information of the selected GUI component in the GUI application, the selected simple graphics representation program component including a paint process execution program for painting the selected GUI component in the GUI application;

when the user input information indicates a selection of a rich graphics representation, extracting from a rich graphics representation component storage section a rich graphics representation program component defining rich graphics display information of the selected GUI component in the GUI application, the selected rich graphics representation program component including an animation execution program for animating the GUI component in the GUI application; and generating the selected GUI component based on the extracted logic program component and on the extracted simple graphics representation program component or the extracted rich graphics representation program component.

6. The computer-readable medium according to claim 5, wherein the method further comprises edit processing of properties, methods, and events corresponding to the selected GUI component.

* * * * *